US012560187B2

(12) United States Patent
    Jude et al.

(10) Patent No.:  US 12,560,187 B2
(45) Date of Patent:      Feb. 24, 2026

(54) LINE CLAMP

(71) Applicant: Hy-Tek Manufacturing Company, Inc., Sugar Grove, IL (US)

(72) Inventors: John David Jude, Scottsdale, AZ (US); John Carl Bastian, Lithia, FL (US); Keane Charles Hensley, Batavia, IL (US)

(73) Assignee: Hy-Tek Manufacturing Company, Inc., Sugar Grove, IL (US)

( * ) Notice: Subject to any disclaimer, the term of this patent is extended or adjusted under 35 U.S.C. 154(b) by 0 days.

(21) Appl. No.: 18/852,746

(22) PCT Filed: Mar. 31, 2023

(86) PCT No.: PCT/US2023/017038
    § 371 (c)(1),
    (2) Date: Sep. 30, 2024

(87) PCT Pub. No.: WO2023/224734
    PCT Pub. Date: Nov. 23, 2023

(65) Prior Publication Data
    US 2025/0215909 A1      Jul. 3, 2025

Related U.S. Application Data

(60) Provisional application No. 63/326,810, filed on Apr. 1, 2022.

(51) Int. Cl.
    F16B 2/08          (2006.01)
(52) U.S. Cl.
    CPC .................................... *F16B 2/08* (2013.01)

(58) Field of Classification Search
    CPC ........................................................ F16B 2/08
    USPC ................................................ 248/74.1–74.3
    See application file for complete search history.

(56) References Cited

U.S. PATENT DOCUMENTS

| | | | | | |
|---|---|---|---|---|---|
| 2,279,865 | A | * | 4/1942 | Ellinwood | ............ F16L 3/1233 29/445 |
| 2,395,926 | A | * | 3/1946 | Webb | ..................... F16L 3/1233 439/869 |
| 2,396,062 | A | * | 3/1946 | Tinnerman | ............ F16L 3/1233 439/779 |

(Continued)

FOREIGN PATENT DOCUMENTS

| | | | |
|---|---|---|---|
| DE | 202007016925 | U1 | 3/2008 |
| JP | 2011007256 | A  * | 1/2011 |

OTHER PUBLICATIONS

Translation of JP-2011007256-A, 10 pages (Year: 2011).*
Goodyear Rubber, 2020, pp. 1-5.

*Primary Examiner* — Muhammad Ijaz
(74) *Attorney, Agent, or Firm* — The Webb Law Firm

(57)          ABSTRACT

The present invention generally relates to line clamps designed to be utilized in a variety of applications including, but not limited to, aerospace applications, vehicle applications, marine applications, etc. In one embodiment, the line clamp of the present invention satisfies the performance requirements as specified in MIL-DTL-85052/1C and MIL-DTL-85052B. In another embodiment, the line clamp of the present invention is comprised of a line clamp core component and a line clamp cushion component that together form a line clamp with improved longevity and fitment.

21 Claims, 10 Drawing Sheets

(56)  References Cited

U.S. PATENT DOCUMENTS

| | | | | |
|---|---|---|---|---|
| 2,396,837 A * | 3/1946 | Ellinwood | F16L 3/1008 | |
| | | | 439/779 | |
| 2,408,572 A * | 10/1946 | Morehouse | F16L 3/1233 | |
| | | | 174/40 CC | |
| RE22,824 E * | 12/1946 | Morehouse | F16L 3/1233 | |
| | | | 248/74.3 | |
| 3,460,788 A | 8/1969 | Goldman | | |
| 3,592,427 A | 7/1971 | Misuraca | | |
| 6,732,982 B1 * | 5/2004 | Messinger | F16L 55/035 | |
| | | | 248/74.1 | |
| 8,161,605 B2 * | 4/2012 | Reichel | F16L 3/1233 | |
| | | | 248/74.1 | |
| 8,282,048 B2 * | 10/2012 | Nguyen | F16L 3/1025 | |
| | | | 248/74.1 | |
| 8,439,317 B2 * | 5/2013 | Sampson | F16L 3/1083 | |
| | | | 248/74.3 | |
| 9,482,369 B2 * | 11/2016 | Sampson | F16L 3/127 | |
| 10,668,878 B1 * | 6/2020 | Sampson | B60R 16/08 | |
| 11,274,771 B2 * | 3/2022 | Geppert | F16L 3/1233 | |
| 11,668,413 B2 * | 6/2023 | Geppert | F16L 3/08 | |
| | | | 248/74.1 | |
| 2007/0257161 A1 * | 11/2007 | Geppert | F16L 3/1233 | |
| | | | 248/74.3 | |
| 2009/0031538 A1 * | 2/2009 | Reichel | F16L 3/1233 | |
| | | | 24/16 PB | |
| 2010/0219301 A1 * | 9/2010 | Sampson | F16L 3/1083 | |
| | | | 248/74.1 | |
| 2010/0243855 A1 * | 9/2010 | Sampson | F16L 3/127 | |
| | | | 248/534 | |
| 2014/0097304 A1 * | 4/2014 | Mastro | F16L 3/243 | |
| | | | 29/428 | |
| 2014/0299722 A1 * | 10/2014 | Sampson | F16L 3/237 | |
| | | | 248/74.2 | |
| 2016/0097413 A1 * | 4/2016 | Sumners | F16L 3/1233 | |
| | | | 24/561 | |
| 2017/0030487 A1 * | 2/2017 | Sampson | F16L 55/035 | |
| 2020/0041040 A1 * | 2/2020 | Geppert | F16L 3/12 | |
| 2022/0049731 A1 * | 2/2022 | You | F16B 2/08 | |
| 2025/0074677 A1 * | 3/2025 | Fang | B65D 63/1027 | |

* cited by examiner

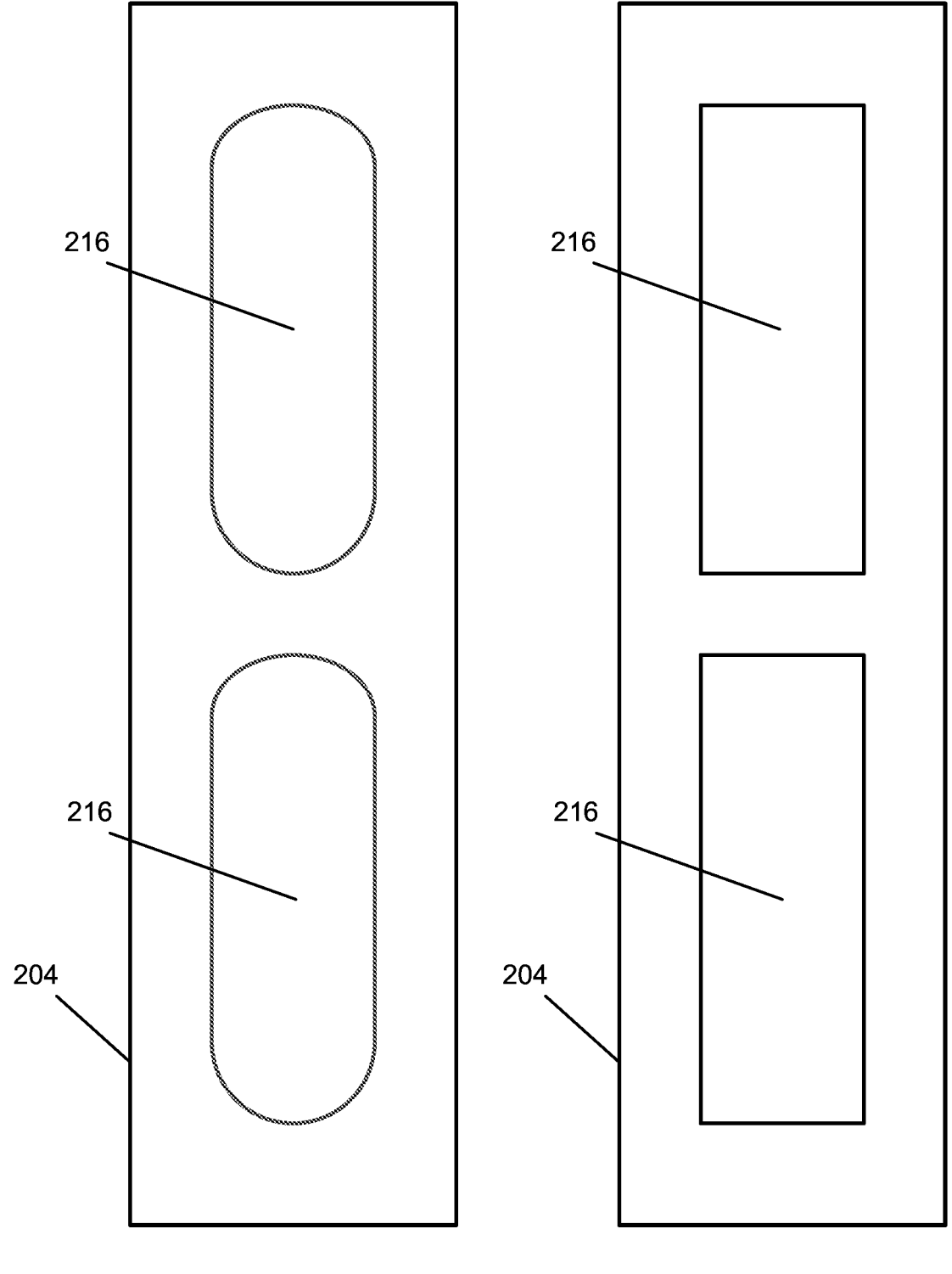
FIG. 7A          FIG. 7B

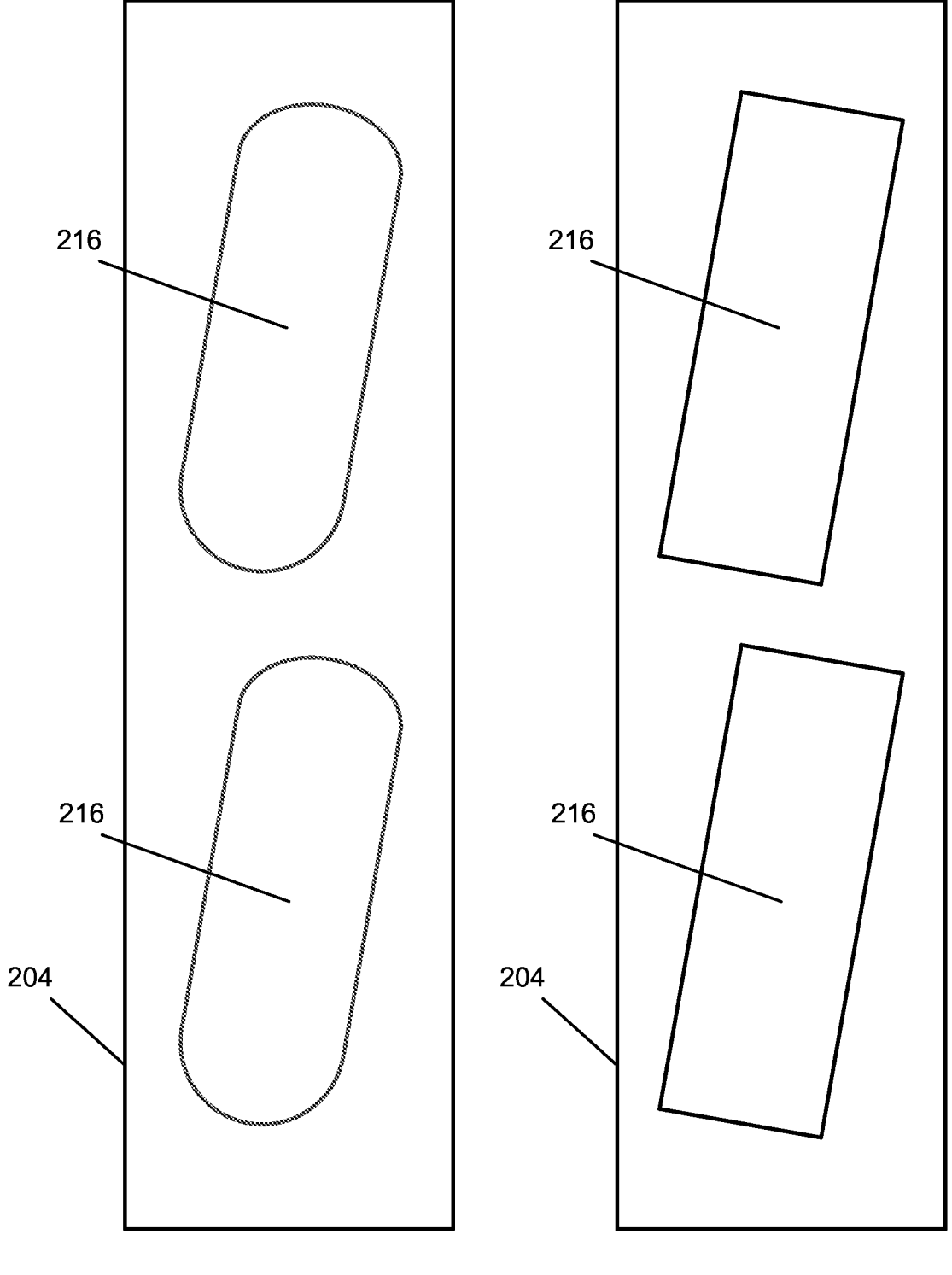
FIG. 7C          FIG. 7D

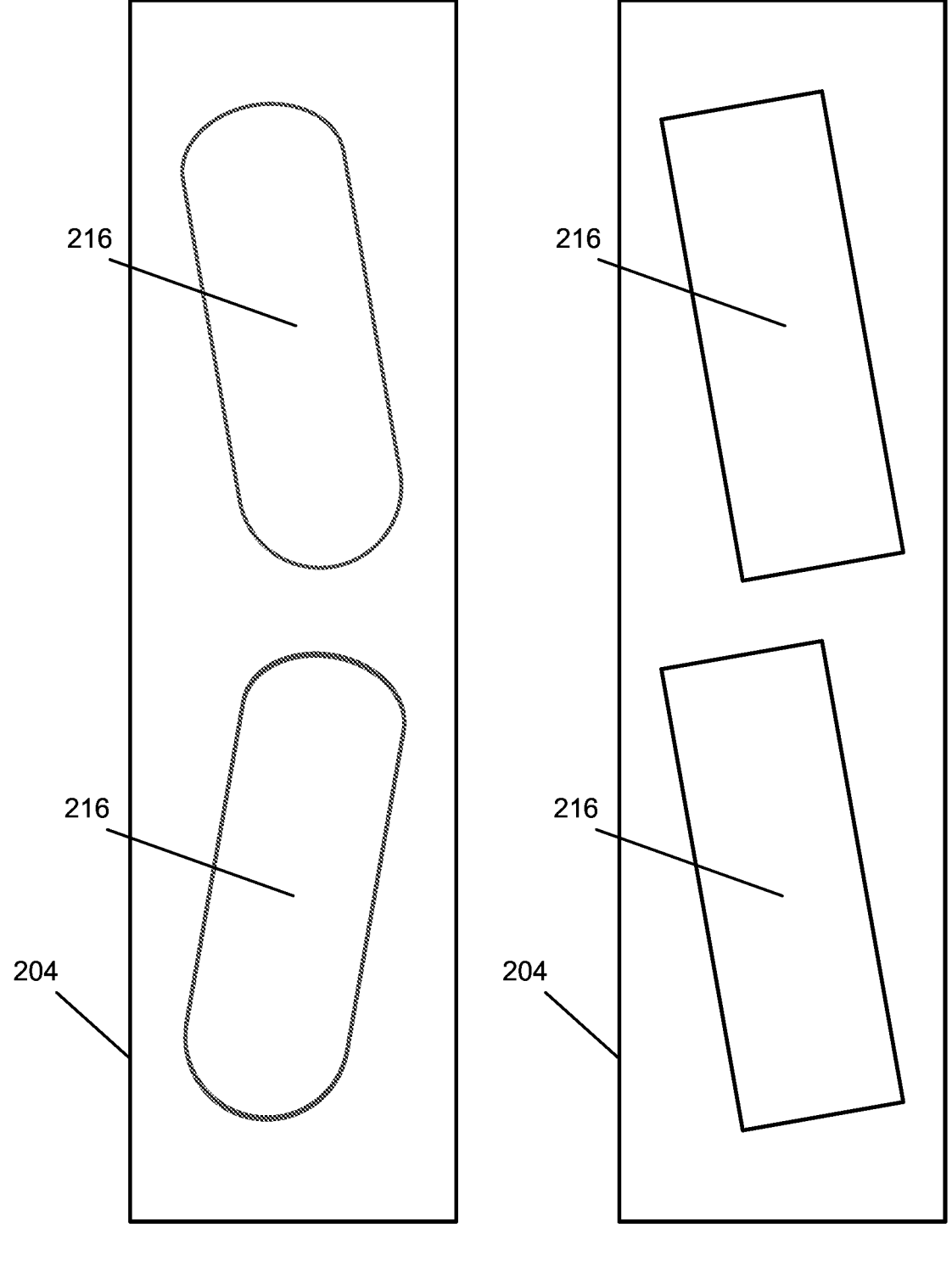
FIG. 7E                    FIG. 7F

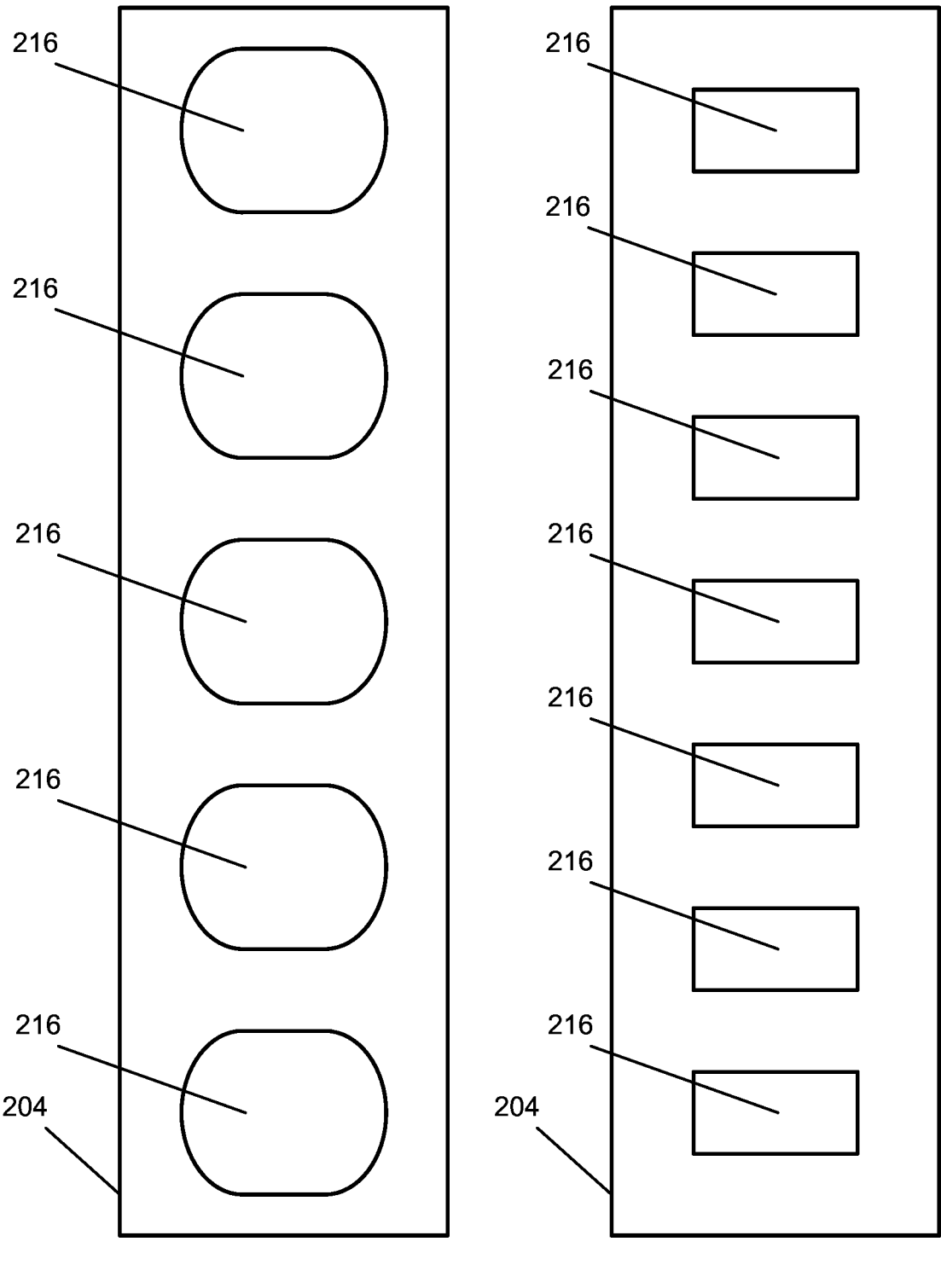
FIG. 7G          FIG. 7H

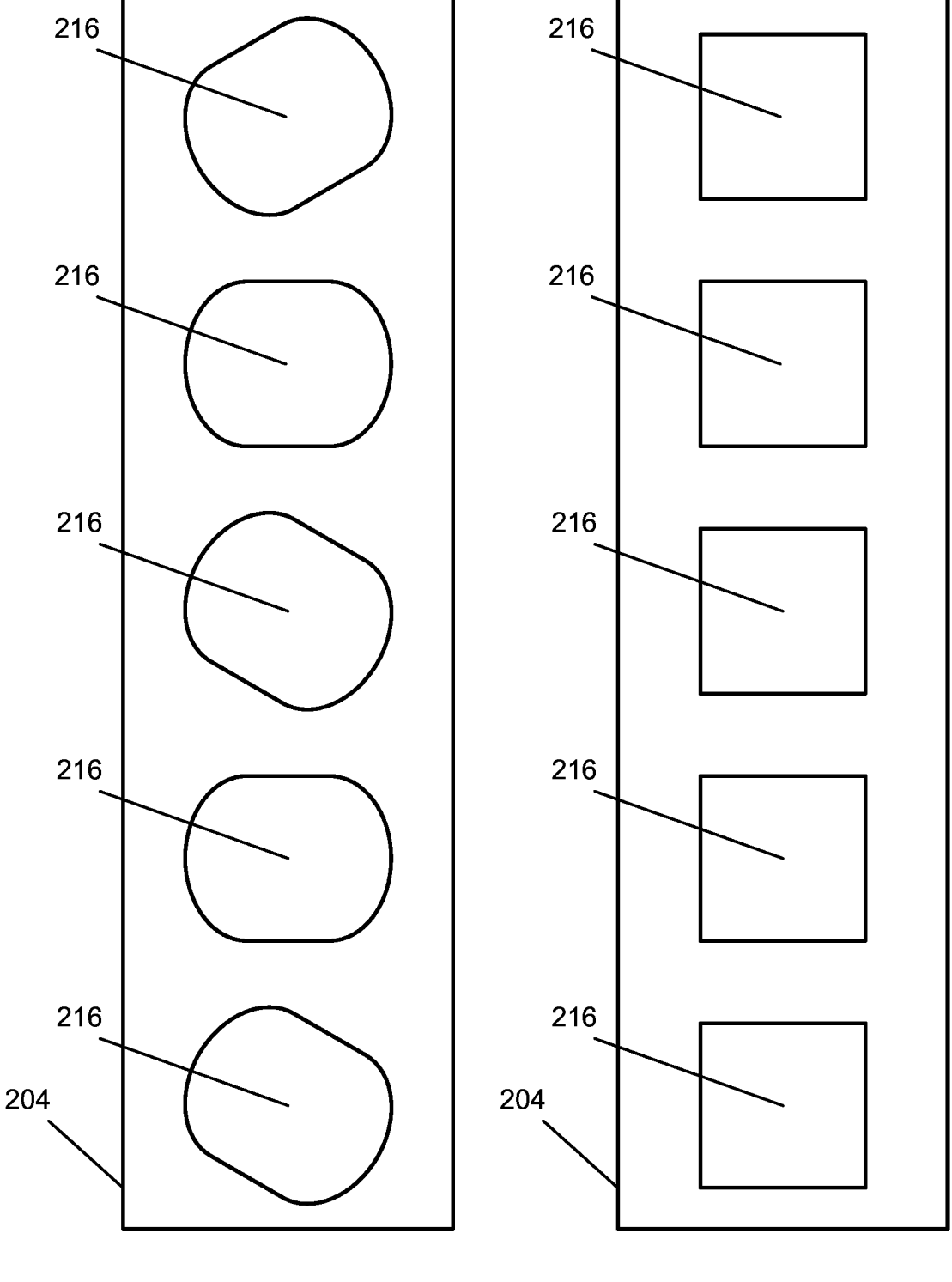
FIG. 8A    FIG. 8B

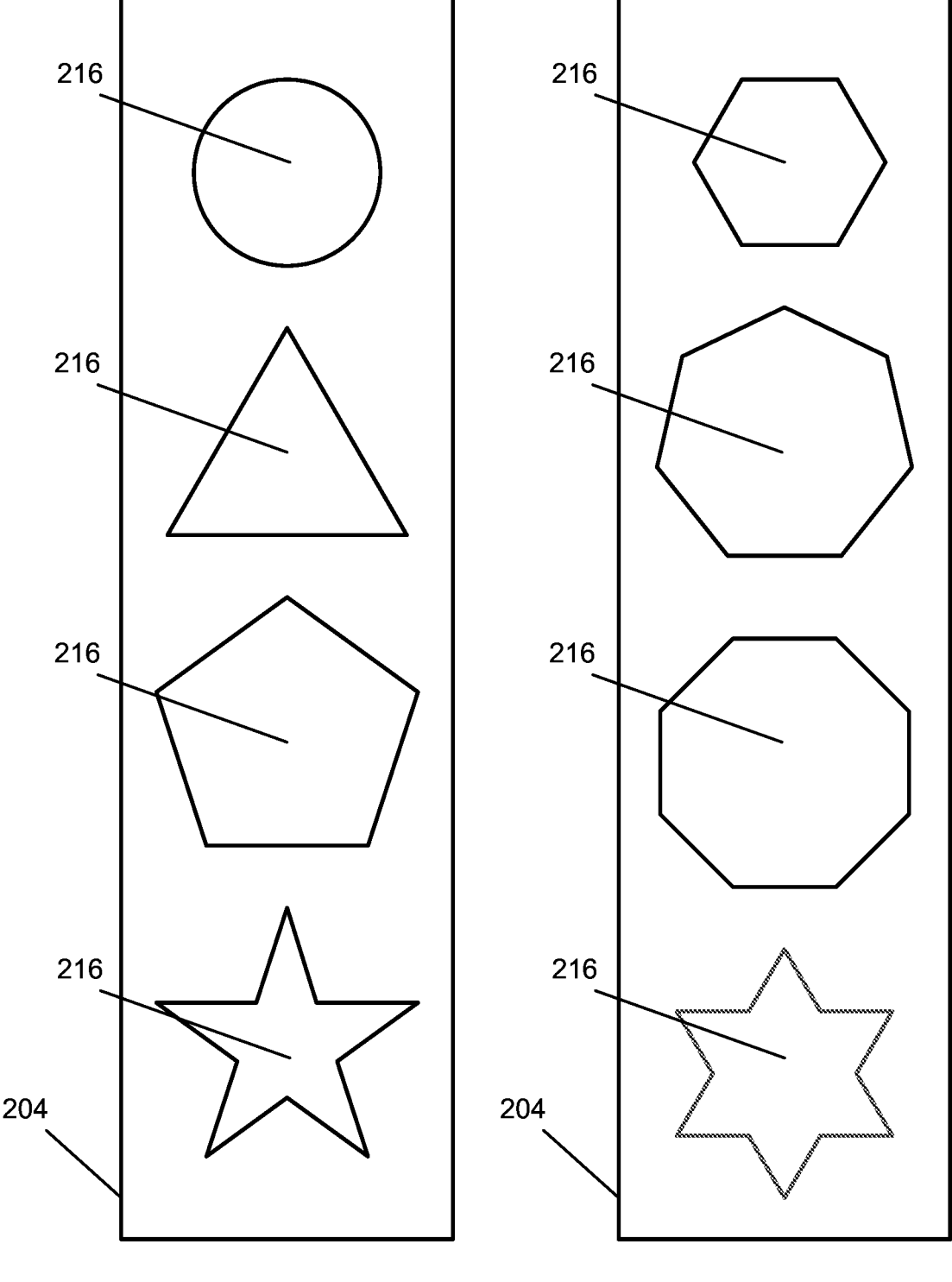
FIG. 8C        FIG. 8D

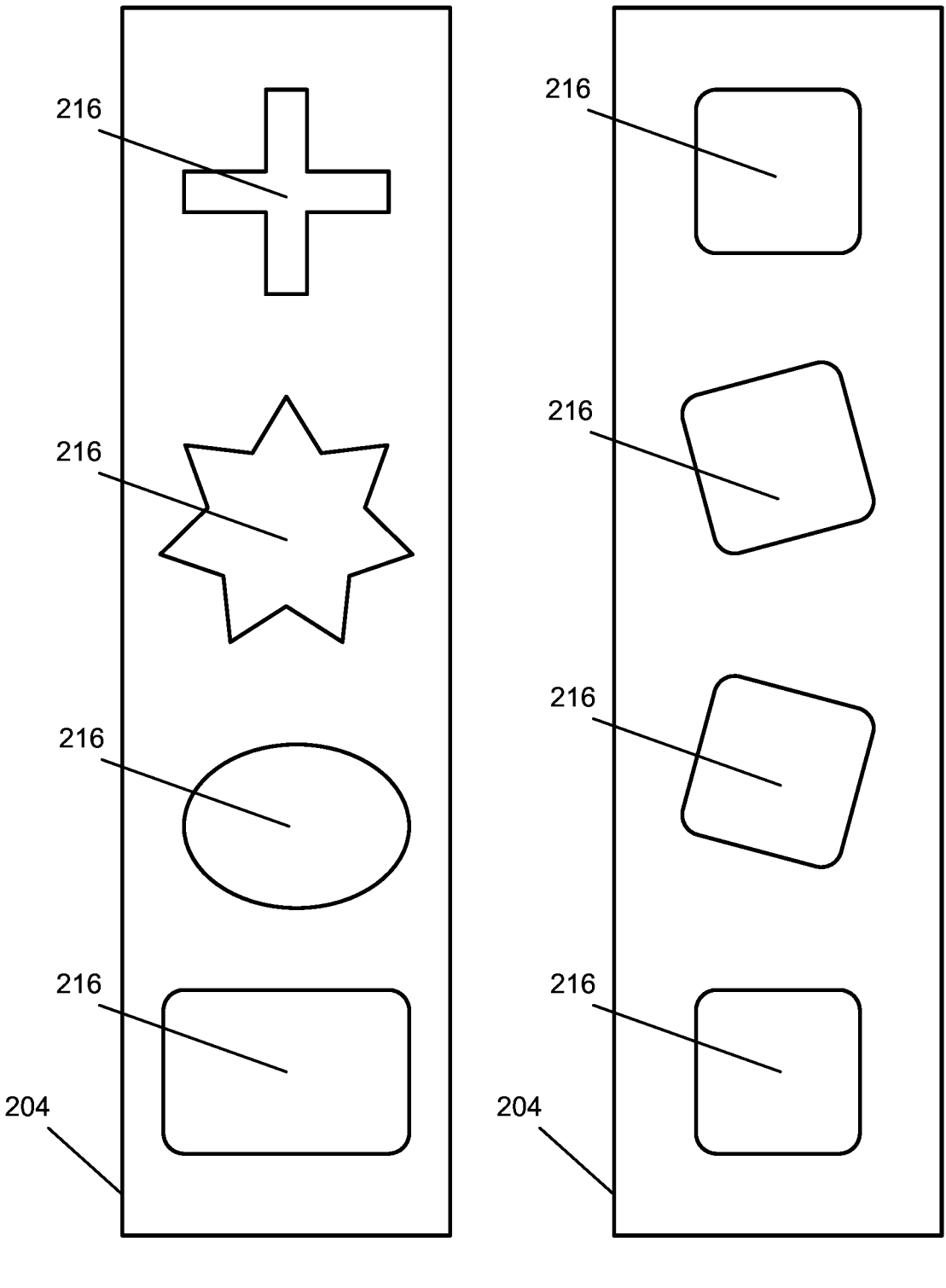
FIG. 8E          FIG. 8F

LINE CLAMP

CROSS REFERENCE TO RELATED APPLICATIONS

This application is the United States national phase of International Patent Application No. PCT/US23/17038 filed Mar. 31, 2023, and claims priority to U.S. Provisional Patent Application No. 63/326,810, filed Apr. 1, 2022, the disclosures of which are hereby incorporated by reference in their entireties.

FIELD OF THE INVENTION

The present invention generally relates to line clamps designed to be utilized in a variety of applications including, but not limited to, aerospace applications, vehicle applications, marine applications, etc. In one embodiment, the line clamp of the present invention satisfies the performance requirements as specified in MIL-DTL-85052/1C and MIL-DTL-85052B. In another embodiment, the line clamp of the present invention is comprised of a line clamp core component and a line clamp cushion component that together form a line clamp with improved longevity and fitment.

BACKGROUND OF THE INVENTION

Hydraulic, fuel, and electrical line clamp integrity is paramount to a variety of engineering applications including, but not limited to, a wide range of aerospace applications, vehicle applications, marine applications, etc. One example of an aerospace application is in Navy aircraft applications that are crucial to flight safety and mission success. In particular, line clamp and/or line clamp cushion failure can result in line abrasion and fatigue that jeopardizes normal aircraft operation and therein crew safety. Currently, deployed Navy aircraft line clamp cushions are fabricated of a nitrile elastomer that is not well suited for prolonged resistance to chemical, UV, and ozone exposure. Additionally, these line clamps and their respective line clamp cushions tend to form an ovular shape around cylindrical lines thereby causing a situation where unnecessary mechanical shear stress and abrasion occur at the line clamp cushion/line interface which then can result in rapid strain related line cushion damage and failure.

Accordingly, given the above, a need exists in the art for improved line clamp designs that addresses the various geometrical, chemical and engineering issues of prior art line clamps.

SUMMARY OF THE INVENTION

The present invention generally relates to line clamps designed to be utilized in a variety of applications including, but not limited to, aerospace applications, vehicle applications, marine applications, etc. In one embodiment, the line clamp of the present invention satisfies the performance requirements as specified in MIL-DTL-85052/1C and MIL-DTL-85052B. In another embodiment, the line clamp of the present invention is comprised of a line clamp core component and a line clamp cushion component that together form a line clamp with improved longevity and fitment.

Accordingly, one aspect of the present invention is a line clamp comprising: a line clamp core; and a line clamp cushion, wherein the line clamp cushion has formed at either end thereof two flat feet areas that are designed to permit the line clamp cushion to form a circular structure when the line clamp is secured in a closed position.

In yet another aspect of the present invention, there is provided a line clamp comprising: a line clamp core; and a line clamp cushion, wherein the line clamp core has formed therein at least one opening designed to receive at least one raised structure, wherein the line clamp cushion has formed thereon at least one raised structure designed to engage with the respective at least one opening of the line clamp core, and wherein the line clamp cushion has formed at either end thereof two flat feet areas that are designed to permit the line clamp cushion to form a circular structure when the line clamp is secured in a closed position.

In yet another aspect of the present invention, there is provided a line clamp comprising: a line clamp core; and a line clamp cushion, wherein the line clamp core has formed therein at least one opening designed to receive at least one raised structure, wherein the line clamp cushion has formed thereon at least one raised structure designed to engage with the respective at least one opening of the line clamp core, wherein the line clamp cushion has formed at either end thereof two flat feet areas that are designed to permit the line clamp cushion to form a circular structure when the line clamp is secured in a closed position, and wherein the line clamp cushion has formed therein two channels designed to receive either long edge of the metal clamp.

In yet another aspect of the present invention, there is provided a line clamp cushion comprising: a first end; a second end; and a line clamp cushion body located between the first end and the second end, wherein the first end and the second end of the line clamp cushion are located at opposite ends of a substantially rectangular strip-shaped line clamp cushion body, and wherein the line clamp cushion has formed therein two flat feet, where the first flat foot is formed on one short end of the line clamp cushion body and the second flat foot is formed on a portion of an inside long surface of the opposite end of the line clamp cushion body such that when the line clamp cushion is closed the line clamp cushion is able to form a circular structure.

In yet another aspect of the present invention, there is provided a line clamp core comprising: a first flat end with a closure opening formed therein; a second flat end opposite the first flat end with a closure opening formed therein, such that when the line clamp core is formed into a substantially circular shape the closure opening of the first flat end and the closure opening of the second flat end line up to form a set of closure openings; and a substantially circular loop located between the first flat end and the second flat end, wherein the circular loop has formed therein at least one opening designed to receive and operative engage at least one raised structure from a corresponding line clamp cushion.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

BRIEF DESCRIPTION OF THE DRAWINGS

FIGS. 7A through 7H are partial close-up top-down views of various different line clamp cushions having various different three-dimensional geometrically-shaped raised structures formed thereon according to various embodiments of the present invention; and FIGS. 8A through 8F are partial close-up top-down views of various different line clamp cushions having various different three-dimensional geometrically-shaped raised structures formed thereon according to various additional embodiments of the present invention.

DETAILED DESCRIPTION OF THE INVENTION

Figure 1:
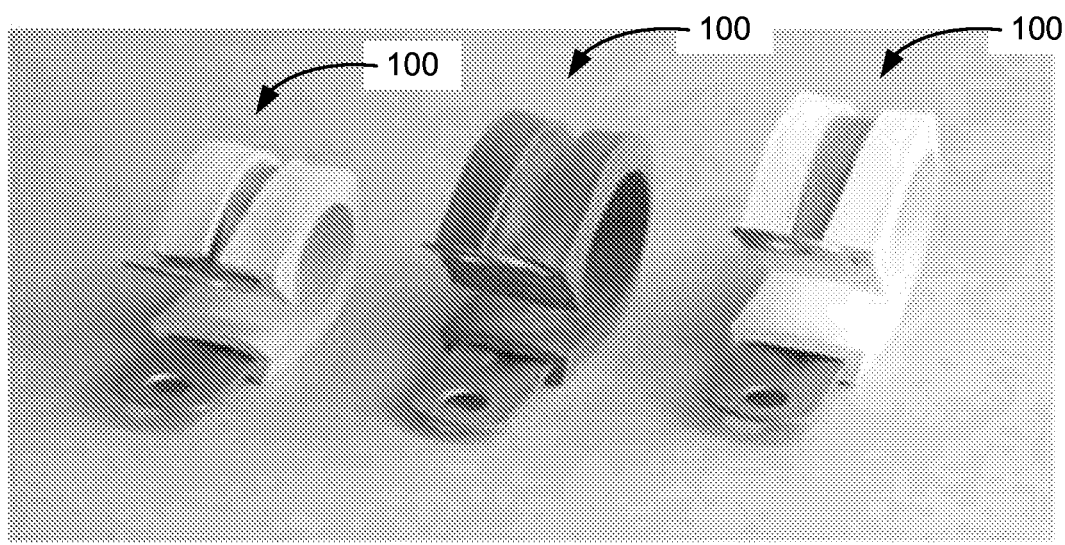
FIG. 1 is a view of a variety of line clamps according to the prior art.

The present invention generally relates to line clamps designed to be utilized in a variety of applications including, but not limited to, aerospace applications, vehicle applications, marine applications, etc. In one embodiment, the line clamp of the present invention satisfies the performance requirements as specified in MIL-DTL-85052/1C and MIL-DTL-85052B. In another embodiment, the line clamp of the present invention is comprised of a line clamp core component and a line clamp cushion component that together form a line clamp with improved longevity and fitment.

In one instance, the line clamp of the present invention solves the problems associated with prior art line clamps via a combination of a geometrically engineered clamp loop and a line clamp cushion formed from a suitable elastomeric, polymer and/or plastic material including, but not limited to, the various materials described below or a fluorosilicone material, where the line clamp cushion is designed to greatly reduce mechanical shear stress and the frequency of strain related line clamp cushion damage. In one embodiment, the line clamp cushion material of the present invention is selected based on the line clamp cushion material's ability to resist deterioration during prolonged UV light exposure, ozone exposure, and/or exposure to various chemicals including, but not limited to, jet fuel, oil and/or hydraulic fluid.

In one embodiment, once a line clamp fails in an aerospace application the resulting "unclamped" hydraulic line and/or fuel tube is no longer adequately supported which can result in one or more immediate problems: the hydraulic and/or fuel tube might break; or the hydraulic and/or fuel tube might chaff or abrade against another tube or structure. Either scenario, or both scenarios, create a detrimental effect for the aircraft and flight crew, further increasing cost and decreasing fleet readiness.

In one embodiment, the present invention addresses the issues with prior art line clamps via a line clamp that comprises a geometrically and structurally engineered line clamp core and a line clamp cushion that, when integrated together, provide enhanced line fit, line clamp cushion shear stress reduction, and/or line stability. In another embodiment, the line clamp of the present invention utilizes a line clamp core and a line clamp cushion are mechanically joined using one or more raised structures (e.g., Mohawk-shaped raised structures or some other raised three-dimensional structure as is described below) that prevent the line clamp core and the line clamp cushion from moving, shifting, and/or vibrating independently. These one or more raised features in the line clamp cushion of the present invention prevent the line clamp core from applying geometrically induced shear stress to the line clamp cushion and/or reduce strain related line clamp cushion damage. Importantly, when assembled, the engineered line clamp core and line clamp cushion structure of the line clamp of the present invention forms a matching concentric shape when installed on cylindrical lines present in a wide range of applications including, but not limited to, aerospace applications, vehicle applications, marine applications, etc. It should be noted that as used herein the term "Mohawk" can refer to any raised three-dimension surface feature on line clamp cushion herein regardless of whether or not such raised structure actually resembles a traditional Mohawk shape.

Due to the design thereof, the concentricity of the line clamp of the present invention is significantly improved thereby resulting in a line clamp that has improved stabilization and diametral retention performance thereby reducing potential line abrasion and damage. When these features are combined with improved UV resistance, ozone resistance, and/or chemical resistance provided by the present invention's line clamp cushion material, the line clamp of the present invention becomes a high performance, high longevity line clamp thereby yielding/realizing significant cost avoidance and a positive return of investment for various end users including, but not limited to, various United States military branches, various aerospace manufacturers, various vehicle manufacturers, and/or various marine vehicle manufacturers.

Figure 2:
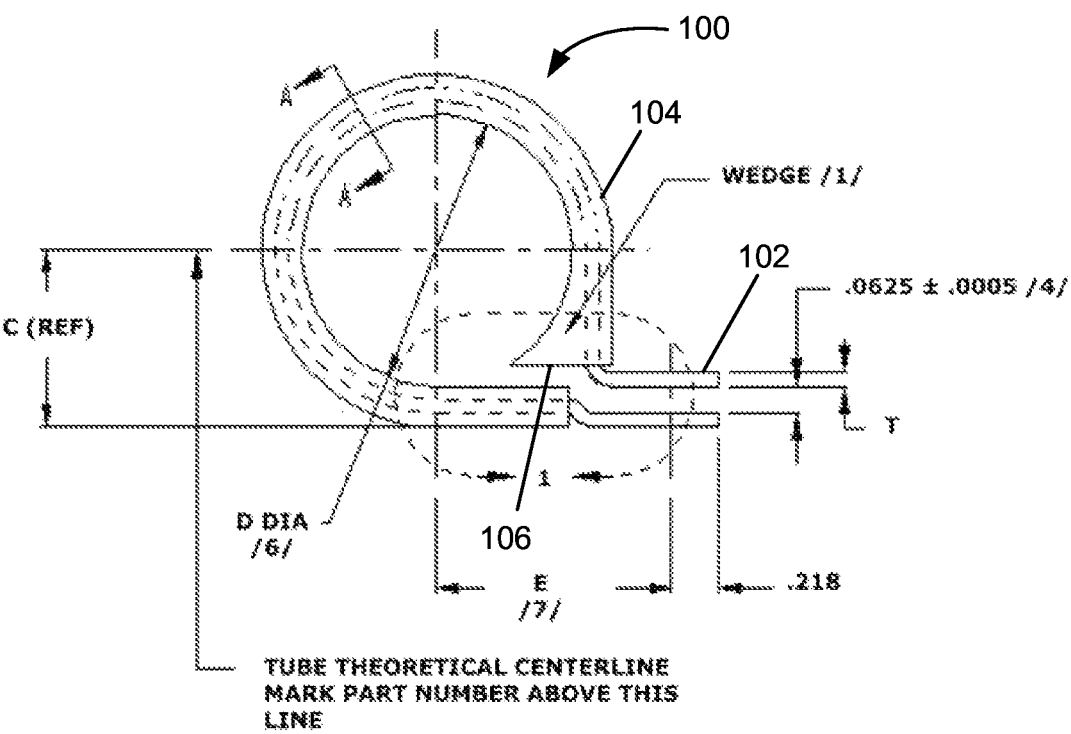
FIG. 2 is an engineering diagram of a line clamp according to the prior art.
Figure 3:
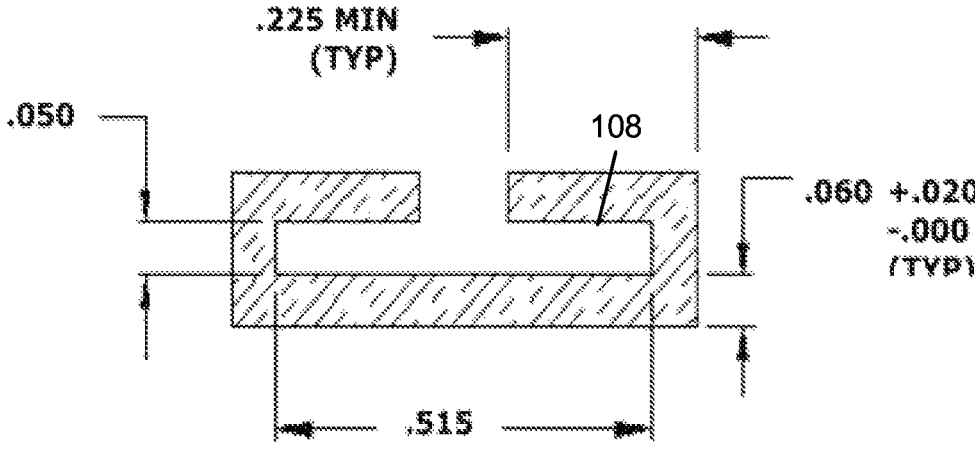
FIG. 3 is a cross-section diagram along the A-A line of FIG. 2.

Turning to FIGS. 1 through 3, FIGS. 1 through 3 are various views of a prior art line clamp 100 where FIG. 1 is a picture of three prior art line clamps 100 of various size types. Regarding FIGS. 2 and 3, FIG. 2 is an engineering diagram of line clamp 100 where line clamp 100 is composed of a metal core 102 and a plastic cushion 104, where plastic cushion 104 has one and only one flat foot area 106 and a notched rectangular cross section 108 (see FIG. 3).

Figure 4:
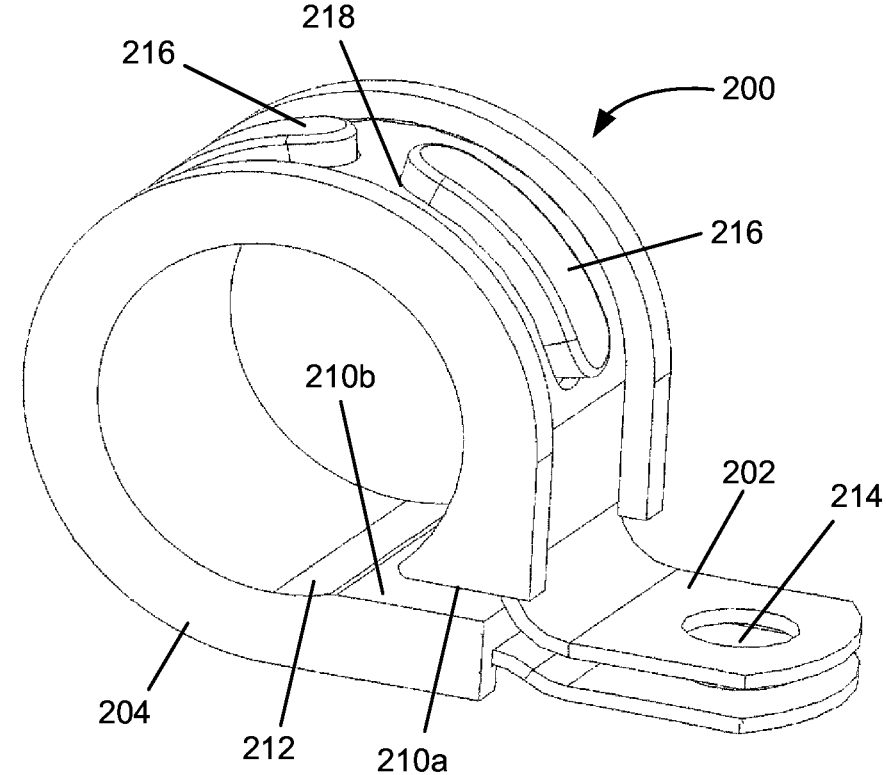
FIG. 4 is a perspective view of a line clamp according to one embodiment of the present invention.
Figure 5:
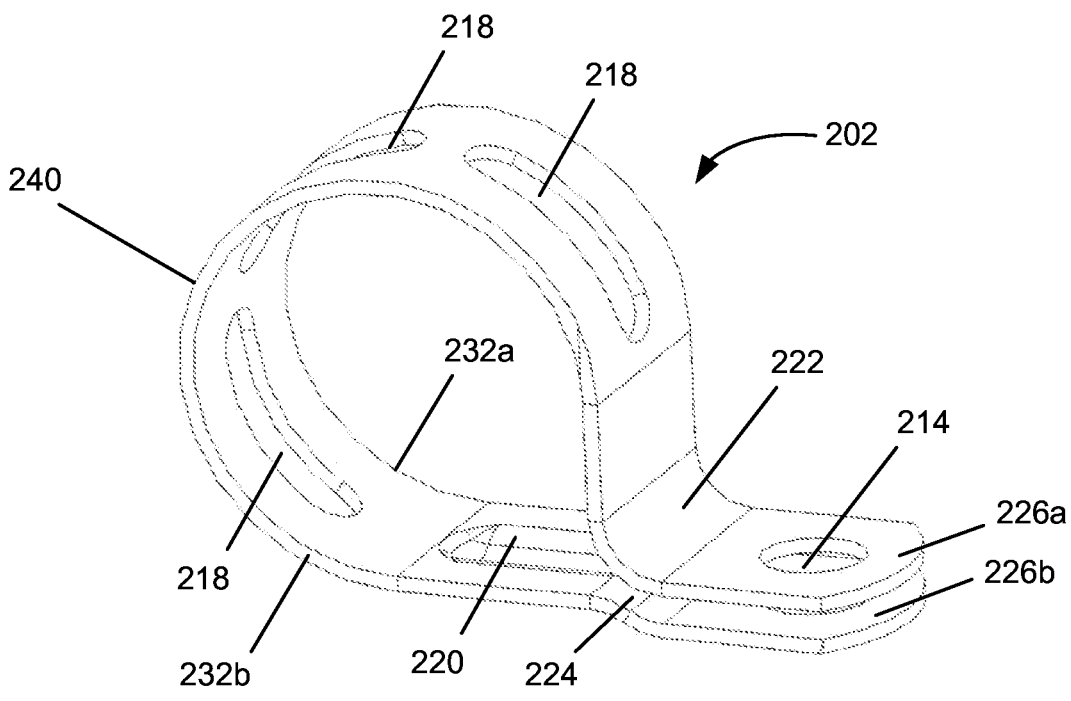
FIG. 5 is a perspective view of one embodiment of a line clamp core used in the line clamp of FIG. 4.
Figure 6:
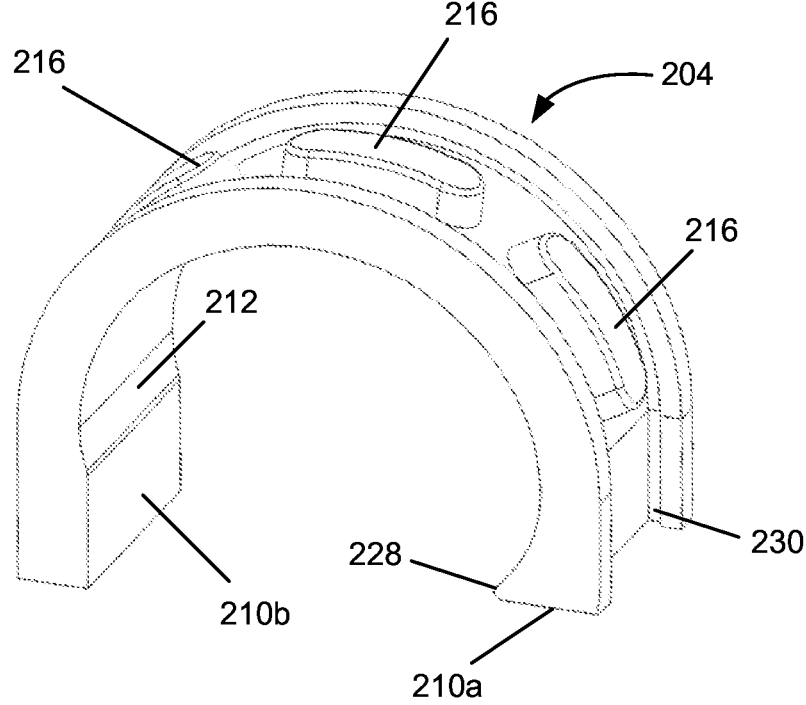
FIG. 6 is a perspective view of one embodiment of a line clamp cushion used in the line clamp of FIG. 4.

Turning to FIGS. 4 through 6, FIGS. 4 through 6 are illustrations of a line clamp 200 of the present invention where line clamp 200 is composed of a line clamp core 202 and a line clamp cushion 204, where line clamp core 202 has at either end thereof a set of corresponding closure openings or holes 214 which are suitable for receiving a bolt and nut or some other closure device (e.g., a rivet, etc.). Closure openings or holes 214 can also be used as anchoring holes where line clamp 200 is to be attached to an anchoring surface such as a wall, etc. Line clamp core 202 further comprises, in one embodiment, at least one structure opening or Mohawk opening 218 (three are shown in FIG. 5) designed to receive one or more corresponding raised structures or raised Mohawk structures 216 and at least one raised gusset area 220 (see FIG. 5) located on the external bottom surface of line clamp core 202. In one instance, raised gusset area 220 helps provide additional gripping forces to secure the placement of line clamp cushion 204 and/or helps line clamp 200 lay flat against a surface when installed.

In one embodiment, line clamp core 202 can be formed from any suitable material including, but not limited to, any suitable metal, any suitable metal alloy, or any suitable elastomeric, polymer and/or plastic material.

In one instance, where line clamp 200 is used in a continuous operating temperature range of less than about 540° C., less than about 500° C., less than about 450° C., less than about 400° C., less than about 350° C., less than about 300° C., less than about 250° C., less than about 200° C., less than about 150° C., less than about 100° C., or even less than about 75° C. any elastomeric, polymer and/or plastic material including, but not limited to, any suitable nylon polymeric material, any suitable PPS (polyphenylene sulfide—whether filled to modify its brittleness or unfilled) material, any suitable PEEK (polyetheretherketone) material, any suitable PEI (polyetherimide) material, any suitable PAI (polyamideimide) material (e.g., Torlon®), any suitable polyimide-based material (e.g., Vespel®, or Meldin®, etc.), any suitable polytetrafluoroethylene (PTFE) material (e.g., Teflon®), or any suitable polybenzimidazole (PBI) material (e.g., Celazole®) can be utilized for line clamp core 202. As would be apparent to those of skill in the art, the continuous operating temperature range to which a line clamp 200 of the present invention would be exposed would dictate the polymer material chosen for line clamp core 202. It should be noted however that continuous operating temperature range is just one factor to be considered when choosing a material from which to form line clamp core 202 from. Other considerations that may need to be considered in choosing a material for line clamp core 202 include, but are not limited to, one or more of UV exposure resistance, ozone exposure resistance, mechanical strength, tensile strength, and/or chemical resistance (e.g., resistance to gasoline, jet fuel, diesel fuel, hydraulic fluids, oils, etc.).

In another instance, line clamp core 202 can be formed from any suitable metal including, but not limited to, aluminum, iron, titanium, copper, nickel, zinc, or tungsten. Again, as would be apparent to those of skill in the art, the continuous operating temperature range to which a line clamp 200 of the present invention would be exposed would dictate the metal chosen for line clamp core 202. It should be noted however that continuous operating temperature range is just one factor to be considered when choosing a material from which to form line clamp core 202 from. Other considerations that may need to be considered in choosing a material for line clamp core 202 include, but are not limited to, one or more of UV exposure resistance, ozone exposure resistance, mechanical strength, tensile strength, and/or chemical resistance (e.g., resistance to gasoline, jet fuel, diesel fuel, hydraulic fluids, oils, etc.).

In still another instance, line clamp core 202 can be formed from any suitable metal alloy including, but not limited to, steel, stainless steel, brass, any suitable aluminum-containing alloy (regardless of whether or not aluminum is present in the greatest amount in any such alloy), any suitable cobalt-containing alloy (regardless of whether or not cobalt is present in the greatest amount in any such alloy), any suitable copper-containing alloy (regardless of whether or not copper is present in the greatest amount in any such alloy), any suitable iron-containing alloy (regardless of whether or not iron is present in the greatest amount in any such alloy), any suitable nickel-containing alloy (regardless of whether or not nickel is present in the greatest amount in any such alloy), any suitable titanium-containing alloy (regardless of whether or not titanium is present in the greatest amount in any such alloy), any suitable tin-containing alloy (regardless of whether or not tin is present in the greatest amount in any such alloy), or any suitable zinc-containing alloy (regardless of whether or not zinc is present in the greatest amount in any such alloy). Again, as would be apparent to those of skill in the art, the continuous operating temperature range to which a line clamp 200 of the present invention would be exposed would dictate the metal alloy chosen for line clamp core 202. It should be noted however that continuous operating temperature range is just one factor to be considered when choosing a material from which to form line clamp core 202 from. Other considerations that may need to be considered in choosing a material for line clamp core 202 include, but are not limited to, one or more of UV exposure resistance, ozone exposure resistance, mechanical strength, tensile strength, and/or chemical resistance (e.g., resistance to gasoline, jet fuel, diesel fuel, hydraulic fluids, oils, etc.). In one instance, suitable specific metal alloys include, but are not limited to, one or more Inconel® alloys, one or more steel alloys, one or more stainless steel alloys, one or more Hastelloy® nickel alloys, or one or more nickel alloys such as 602 CA.

In still another embodiment, line clamp core 202 can be formed from any suitable non-metal material including, but not limited to, carbon fiber or a suitable ceramic material (e.g., Macor®). Again, as would be apparent to those of skill in the art, the continuous operating temperature range to which a line clamp 200 of the present invention would be exposed would dictate the non-metal material chosen for line clamp core 202. It should be noted however that continuous operating temperature range is just one factor to be considered when choosing a material from which to form line clamp core 202 from. Other considerations that may need to be considered in choosing a material for line clamp core 202 include, but are not limited to, one or more of UV exposure resistance, ozone exposure resistance, mechanical strength, tensile strength, and/or chemical resistance (e.g., resistance to gasoline, jet fuel, diesel fuel, hydraulic fluids, oils, etc.).

In one embodiment, line clamp cushion 204 can be formed from any suitable material including, but not limited to, any suitable elastomeric, polymer and/or plastic material.

In one instance, where line clamp 200 is used in a continuous operating temperature range of less than about 540° C., less than about 500° C., less than about 450° C., less than about 400° C., less than about 350° C., less than about 300° C., less than about 250° C., less than about 200° C., less than about 150° C., less than about 100° C., or even less than about 75° C. any elastomeric, polymer and/or plastic material including, but not limited to, any suitable nylon polymeric material, any suitable PPS (polyphenylene sulfide—whether filled to modify its brittleness or unfilled) material, any suitable PEEK (polyetheretherketone) material, any suitable PEI (polyetherimide) material, any suitable PAI (polyamideimide) material (e.g., Torlon®), any suitable polyimide-based material (e.g., Vespel®, or Meldin®, etc.), any suitable polytetrafluoroethylene (PTFE) material (e.g., Teflon®), or any suitable polybenzimidazole (PBI) material (e.g., Celazole®) could be utilized for line clamp cushion 204. In still another embodiment, line clamp cushion 204 can be formed from any suitable nitrile butadiene rubber compound, any suitable ethylene propylene rubber compound, and/or any suitable fabric-reinforced silicone rubber. As would be apparent to those of skill in the art, the continuous operating temperature range to which a line clamp 200 of the present invention would be exposed would dictate the polymer material chosen for line clamp cushion 204. It should be noted however that continuous operating temperature range is just one factor to be considered when choosing a material from which to form line clamp cushion 204 from. Other considerations that may need to be considered in choosing a material for line clamp cushion 204 include, but are not limited to, one or more of UV exposure resistance, ozone exposure resistance, mechanical strength, tensile strength, and/or chemical resistance (e.g., resistance to gasoline, jet fuel, diesel fuel, hydraulic fluids, oils, etc.).

In another embodiment, line clamp cushion 204 is formed from a fluoroelastomer compounds selected from various suitable fluorosilicone rubber and/or elastomeric compounds that is at least UV-resistant, ozone-resistant and/or possess resistance to one or more chemicals.

As can be seen from FIG. 5, line clamp core 202 has a curved area 222 and a sloped area 224 so that ends 226a and 226b can be contacted together when line clamp 200 is closed with a closure device. As can also be seen from FIG. 5, line clamp core 202 further comprises a substantially circular line clamp core loop 240 that is located between curved area 222 and a sloped area 224.

Regarding FIG. 6, FIG. 6 illustrates one embodiment of line clamp cushion 204 where line clamp cushion 204 has two flat feet areas 210a and 210b located at opposite ends of line clamp cushion 204 where flat foot area 210a is located at the end of an arc 228 and flat foot area 210b is located at the opposite end of line clamp cushion 204 on what becomes the inner surface of clamp cushion 204 adjacent to a sloped transition area 212. Line clamp cushion 204, in one embodiment, further comprises at least one raised structure or at least one raised Mohawk structure 216 sized to fit through and engage a respective structure opening or Mohawk opening 218 in line clamp core 202.

As shown in the embodiment of FIG. 6, line clamp cushion 204 has three raised structures or raised Mohawk structures 216 that are designed to operatively engage the three corresponding structure openings or Mohawk openings 218 (see FIG. 5). It should be noted however that the present invention is not limited to just this configuration, the shape and/or number of raised Mohawk structures can be altered so long as there is at least one raised Mohawk structure 216 formed in the exterior surface of line clamp cushion 204 designed to engage at least one respective structure opening or Mohawk opening 218 in line clamp core 202. In still another embodiment, line clamp cushion 204 further has a pair of channels 230 (only one side of the pair of channels 230 are illustrated in FIG. 6) designed to receive respective edges 232a and 232b of line clamp core 202.

Due to flat feet areas 210a and 210b, when line clamp 200 is secured in a closed position, line clamp 200 is able to form a circular cushioned structure rather than the teardrop-shaped structure of the line clamp 200 of the prior art. In another embodiment, the one or more raised Mohawk structures 216 and their one or more respective structure openings or Mohawk openings 218 permit line clamp cushion 204 to be more securely engaged to line clamp core 202 thereby permitting line clamp 200 to have improved life expectancy and durability.

In another embodiment, the line clamp core 202 and the line clamp cushion 204 of the present invention have at least two, at least three, at least four, at least five, at least six, or even at least seven or more structure openings or Mohawk openings 218 in line clamp core 202 that correspond to and are designed to receive respective raised structures or raised Mohawk structures 216 on a one to one basis such that openings 218 and structures 216 operatively engage with one another. Although FIGS. 4 through 6 illustrate raised oval-shaped structures or raised Mohawk structures 216 on line clamp cushion 204 and the corresponding oval-shaped structure openings or Mohawk openings 218 in line clamp core 202, the present invention is not limited to solely this geometrical arrangement.

Rather, any three-dimensional shape can be utilized for raised structures or raised Mohawk structures 216 on line clamp cushion 204 and the corresponding structure openings or Mohawk openings 218 in line clamp core 202. As such, FIGS. 7A through 7H are partial close-up top-down views of various different line clamp cushions 204 having various different three-dimensional geometrically-shaped raised structures or three-dimensional geometrically-shaped raised Mohawk structures 216 formed on line clamp cushion 204 according to various embodiments of the present invention, and FIGS. 8A through 8F are additional partial close-up top-down views of various different line clamp cushions 204 having further additional various different three-dimensional geometrically-shaped raised structures or three-dimensional geometrically-shaped raised Mohawk structures 216 formed on line clamp cushion 204 according to various additional embodiments of the present invention.

Given the above, it is clear that raised structures or raised Mohawk structures 216 on line clamp cushion 204 and the corresponding structure openings or Mohawk openings 218 in line clamp core 202 can be square, rounded squares, triangles, rectangles, rounded rectangles, pentagons, hexagon, heptagon, octagon, star-shaped, crosses, solid figure eight designs (i.e., meaning the eights have no holes in them), etc. As such, it is clear that any raised three-dimensional shape can be utilized for raised structures or raised Mohawk structures 216 on line clamp cushion 204 so long as a corresponding shape can be produced in structure openings or Mohawk openings 218 in line clamp core 202. As such, any combination of various three-dimensional raised shapes or three-dimensional raised Mohawk shapes can be used including, but not limited to, all the same raised shapes, randomly mixed different raised shapes, alternating raised shapes, etc.

Furthermore, the geometric orientation of the raised structures or raised Mohawk structures 216 of line clamp cushion 204 and the corresponding structure openings or Mohawk openings 218 are not just limited to the parallel long axis orientation shown in FIGS. 4 through 6. Rather, any parallel orientation, any angled or tilted orientation, any perpendicular orientation, any mixed orientation of two or more parallel-angle/tilted-perpendicular raised Mohawks can be utilized (see FIGS. 7A through 7H and FIGS. 8A through 8F for non-limiting cross-sections of various raised Mohawk shapes and Mohawk orientation examples).

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A line clamp comprising:

a line clamp core; and a line clamp cushion, wherein the line clamp cushion has formed at either end thereof two flat feet, a first flat foot and a second flat foot, wherein the first flat foot is wedge-shaped and is located on one end of a body of the line clamp cushion, wherein the second flat foot is formed on a long surface of an opposite end of the body of the line clamp cushion such that the second flat foot is located on a portion of an inside horizontal end surface of the opposite end of the body of the line clamp cushion, wherein the first flat foot has a flat bottom edge located on a short end surface of the body of the line clamp cushion and at least one sloped side edge located on an inside long surface of the body of the line clamp cushion, wherein the flat bottom edge of the first flat foot is equal in length to a horizontal length of the second flat foot, wherein a sloped transition area is located on an inside horizontal surface inwardly and immediately adjacent to the end where the second flat foot is located, and wherein, when the line clamp is secured in a closed position, the at least one sloped side edge of the first flat foot meets a leading edge of the sloped transition area such that the combination of first flat foot, the second flat foot, the at least one sloped side edge of the first flat foot, and the sloped transition area permit the line clamp cushion to form a circular structure when the line clamp is secured in a closed position.

2. The line clamp of claim 1, wherein the line clamp core is formed from a metal, a metal alloy, an elastomeric material, a polymer material, a plastic material, a ceramic material, or a carbon fiber material.

3. The line clamp of claim 1, wherein the line clamp cushion is formed from an elastomeric material, a polymer material, a plastic material.

4. The line clamp of claim 3, wherein the line clamp cushion is formed from a fluorosilicone rubber.

5. The line clamp of claim 1, wherein the line clamp satisfies the performance requirements specified in MIL-DTL-85052/1C and/or MIL-DTL-85052B.

6. A line clamp comprising:

a line clamp core, wherein the line clamp core has formed therein a plurality of openings; and a line clamp cushion, wherein the line clamp cushion has formed therein an equal number of a plurality of raised structures designed to engage, on a one-to-one basis, with each of the plurality of openings formed in the line clamp core, wherein the line clamp cushion has formed at either end thereof two flat feet, a first flat foot and a second flat foot, wherein the first flat foot is wedge-shaped and is located on one end of a body of the line clamp cushion, wherein the second flat foot is formed on a long surface of an opposite end of the body of the line clamp cushion such that the second flat foot is located on a portion of an inside horizontal end surface of the opposite end of the body of the line clamp cushion, wherein the first flat foot has a flat bottom edge located on a short end surface of the body of the line clamp cushion and at least one sloped side edge located on an inside long surface of the body of the line clamp cushion, wherein the flat bottom edge of the first flat foot is equal in length to a horizontal length of the second flat foot, wherein a sloped transition area is located on an inside horizontal surface inwardly and immediately adjacent to the end where the second flat foot is located, and wherein, when the line clamp is secured in a closed position, the at least one sloped side edge of the first flat foot meets a leading edge of the sloped transition area such that the combination of first flat foot, the second flat foot, the at least one sloped side edge of the first flat foot, and the sloped transition area permit the line clamp cushion to form a circular structure when the line clamp is secured in a closed position.

7. The line clamp of claim 6, wherein the line clamp core is formed from a metal, a metal alloy, an elastomeric material, a polymer material, a plastic material, a ceramic material, or a carbon fiber material.

8. The line clamp of claim 6, wherein the line clamp cushion is formed from an elastomeric material, a polymer material, or a plastic material.

9. The line clamp of claim 8, wherein the line clamp cushion is formed from a fluorosilicone rubber.

10. The line clamp of claim 6, wherein the line clamp satisfies the performance requirements specified in MIL-DTL-85052/1C and/or MIL-DTL-85052B.

11. The line clamp of claim 8, wherein the line clamp cushion has formed therein three raised structures on an external surface of line clamp cushion designed to engage with three respective openings in the line clamp core.

12. A line clamp comprising:

a line clamp core, wherein the line clamp core has formed therein a plurality of openings; and a line clamp cushion, wherein the line clamp cushion has formed therein an equal number of a plurality of raised structures designed to engage, on a one-to-one basis, with each of the plurality of openings formed in the line clamp core, wherein the line clamp cushion has formed at either end thereof two flat feet, a first flat foot and a second flat foot, wherein the first flat foot is wedge-shaped and is located on one end of a body of the line clamp cushion, wherein the second flat foot is formed on a long surface of an opposite end of the body of the line clamp cushion such that the second flat foot is located on a portion of an inside horizontal end surface of the opposite end of the body of the line clamp cushion, wherein the first flat foot has a flat bottom edge located on a short end surface of the body of the line clamp cushion and at least one sloped side edge located on an inside long surface of the body of the line clamp cushion, wherein the flat bottom edge of the first flat foot is equal in length to a horizontal length of the second flat foot, wherein a sloped transition area is located on an inside horizontal surface inwardly and immediately adjacent to the end where the second flat foot is located, wherein, when the line clamp is secured in a closed position, the at least one sloped side edge of the first flat foot meets a leading edge of the sloped transition area such that the combination of first flat foot, the second flat foot, the at least one sloped side edge of the first flat foot, and the sloped transition area permit the line clamp cushion to form a circular structure when the line clamp is secured in a closed position, and wherein the line clamp cushion has formed therein two channels designed to receive either long edge of the line clamp core.

13. The line clamp of claim 12, wherein the line clamp core is formed from a metal, a metal alloy, an elastomeric material, a polymer material, a plastic material, a ceramic material, or a carbon fiber material.

14. The line clamp of claim 12, wherein the line clamp cushion is formed from an elastomeric material, a polymer material, or a plastic material.

15. The line clamp of claim 14, wherein the line clamp cushion is formed from a fluorosilicone rubber.

16. The line clamp of claim 12, wherein the line clamp satisfies the performance requirements specified in MIL-DTL-85052/1C and/or MIL-DTL-85052B.

17. The line clamp of claim 12, wherein the line clamp cushion has formed therein three raised structures on an external surface of line clamp cushion designed to engage with three respective openings in the line clamp core.

18. A line clamp cushion comprising:

a first end;

a second end; and a line clamp cushion body located between the first end and the second end, wherein the first end and the second end of the line clamp cushion are located at opposite ends of a substantially rectangular-shaped line clamp cushion body, and wherein the line clamp cushion has formed therein two flat feet, a first flat foot and a second flat foot, wherein the first flat foot is wedge-shaped and is located on one end of a body of the line clamp cushion, wherein the second flat foot is formed on a long surface of an opposite end of the body of the line clamp cushion such that the second flat foot is located on a portion of an inside horizontal end surface of the opposite end of the body of the line clamp cushion, wherein the first flat foot has a flat bottom edge located on a short end surface of the body of the line clamp cushion and at least one sloped side edge located on an inside long surface of the body of the line clamp cushion, wherein the flat bottom edge of the first flat foot is equal in length to a horizontal length of the second flat foot, wherein a sloped transition area is located on an inside horizontal surface inwardly and immediately adjacent to the end where the second flat foot is located, and wherein, when the line clamp cushion is secured in a closed position, the at least one sloped side edge of the first flat foot meets a leading edge of the sloped transition area such that the combination of first flat foot, the second flat foot, the at least one sloped side edge of the first flat foot, and the sloped transition area permit the line clamp cushion to form a circular structure when the line clamp cushion is closed.

19. The line clamp cushion of claim 18, wherein the line clamp cushion is formed from an elastomeric material, a polymer material, or a plastic material.

20. The line clamp cushion of claim 18, wherein the line clamp cushion is formed from a fluorosilicone rubber.

21. The line clamp cushion of claim 18, wherein the line clamp cushion has formed therein two or more, three or more, four or more, five or more, six or more, or even seven or more raised structures on an exterior surface thereof.

* * * * *